United States Patent [19]
Hoffman

[11] Patent Number: 5,169,129
[45] Date of Patent: Dec. 8, 1992

[54] VARIABLE RATE AIR SPRING SUSPENSION SYSTEM

[75] Inventor: Keith E. Hoffman, Atlanta, Ind.

[73] Assignee: Bridgestone/Firestone, Inc., Akron, Ohio

[21] Appl. No.: 765,857

[22] Filed: Sep. 26, 1991

[51] Int. Cl.⁵ .............................................. F16F 9/04
[52] U.S. Cl. .............................. 267/64.27; 267/122; 280/711
[58] Field of Search ............... 267/64.19, 64.23, 64.25, 267/64.27, 64.28, 218, 122; 188/298; 280/104, 678, 683, 711

[56] References Cited

U.S. PATENT DOCUMENTS

| | | |
|---|---|---|
| 2,115,072 | 4/1938 | Hunt et al. |
| 2,133,279 | 10/1938 | Brown .......................... 267/64.19 X |
| 2,901,241 | 8/1959 | Lautzenhiser et al. ...... 267/64.19 X |
| 2,917,318 | 12/1959 | Nallinger ..................... 267/64.19 X |
| 2,973,968 | 3/1961 | Behles ................................. 280/104 |
| 3,039,761 | 6/1962 | Van Zijp . |
| 3,552,763 | 1/1971 | Yasin .................................. 280/104 |
| 3,989,232 | 11/1976 | Steinbach et al. .............. 267/122 X |
| 4,159,105 | 6/1979 | Vander Laan . |
| 4,564,177 | 1/1986 | Leonar et al. ..................... 267/64.24 |
| 4,592,540 | 6/1986 | Yokoya et al. . |
| 4,718,650 | 1/1988 | Geno ................................. 267/64.27 |
| 4,743,000 | 5/1988 | Karnopp ............................ 267/218 |
| 4,787,606 | 11/1988 | Geno et al. ....................... 267/64.27 |
| 4,787,608 | 11/1988 | Elliott .............................. 267/64.27 |
| 4,856,626 | 8/1989 | Nakanishi ..................... 267/64.27 X |

FOREIGN PATENT DOCUMENTS 0123171 10/1984 European Pat. Off. ......... 267/64.27

Primary Examiner—Robert J. Oberleitner
Assistant Examiner—Peter M. Poon
Attorney, Agent, or Firm—Ernst H. Ruf

[57] ABSTRACT

An air spring suspension system which provides a variable rate for an air spring of a vehicle, has an auxiliary air reservoir formed by a second air spring in fluid communication with the vehicle air spring. One end member of the auxiliary air spring is mounted on a frame and the other end member, preferably a piston, is moved with respect to the other end member to vary the volume of the air chamber formed by a flexible sleeve extending between the end member and piston. An actuator motor moves the piston with respect to the fixed end member, via a linearly movable shaft to change the volume of the air chamber and consequently the rate of the vehicle air spring.

10 Claims, 2 Drawing Sheets

VARIABLE RATE AIR SPRING SUSPENSION SYSTEM

BACKGROUND OF THE INVENTION

1. Technical Field

The invention relates to air suspension systems and in particular to an air suspension system used for vehicles. More particularly, the invention relates to air suspension systems having an auxiliary air reservoir formed by a second air spring which communicates with the air chamber of the vehicle air spring to enable the rate of the vehicle air spring to be varied by adjusting the volume of air in the auxiliary reservoir of the second air spring.

2. Background Information

Air springs have been used for a considerable number of years for various applications, including use in vehicles for absorbing road shock imparted onto the wheels of a vehicle upon the wheel encountering a projection or depression in the roadway. Some examples of such air springs are shown in U.S. Pat. Nos. 4,564,177, 4,718,650, 4,787,606 and 4,787,608.

Each air spring will have a specific spring rate depending upon the design of the air spring components which will provide various ride characteristics for the vehicle on which the particular air spring is mounted. One of the factors which determines the spring rate is the volume of air contained within the flexible sleeve or bellows of the air spring. Varying the volume of air in the flexible sleeve of the air spring enables various spring rates to be achieved. This is presently being accomplished by various means, such as by supplying or removing air into or from the air spring through various control valves, and by the use of auxiliary air reservoirs which are fluidly connected to the vehicle air spring, which air spring is mounted on and extends between spaced structural members of the vehicle. Thus, when a vehicle wheel encounters a depression or projection in the roadway, air will be introduced into or removed from the vehicle air spring by means of the auxiliary reservoir to change the volume of air within the vehicle air spring, thereby changing the spring rate in order to provide the desired ride characteristics for the vehicle.

Heretofore, these auxiliary air springs usually consisted of a rigid canister mounted remotely from the vehicle air spring and connected thereto by a hose or other fluid communication lines. Those canisters generally contained various means for adjusting the volume of the air chamber within the canister, such as a slidably mounted piston.

Examples of such prior art air springs containing auxiliary reservoirs are shown in the following U.S. patents.

Hunt, U.S. Pat. No. 2,115,072 shows a very early air spring having an auxiliary reservoir formed of a solid container with an internally movable piston member. In this arrangement, the spring rate of the suspension system is varied by use of a valve and pump that automatically allows, in accordance with the load on the vehicle, alteration of the spring rate by allowing air to be moved back and forth between the air spring and reservoir.

Van Zijp, U.S. Pat. No. 3,039,761 discloses another air spring having a pair of reservoirs arranged in a series circuit relationship with the air spring. Each of these reservoirs has a fluid passage which communicates with the air spring that contains a mass of porous material which affords a flow area of different size in each passage for affecting the damping of the air spring.

Vander Laan, U.S. Pat. No. 4,159,105 discloses a shock absorber having an adjustable spring load wherein fluid can be pumped from a reservoir into an area of the shock absorber to compress the spring for preload by use of a rigid cylinder and manually operated pump which moves a piston within the cylinder, to affect the transfer of air or fluid into the shock absorber.

Yokoya, U.S. Pat. No. 4,592,540 discloses a Macpherson type strut air suspension system which has an adjustable spring rate wherein there are primary and secondary air chambers in the unit, rather than a separate reservoir.

Karnopp, U.S. Pat. No. 4,743,000 is believed to be the closest known prior art to the present invention. This patent discloses an air spring having an auxiliary reservoir connected thereto, wherein a piston is movable within a rigid cylinder which forms the auxiliary reservoir by means of a drive member. In this system, a rapid switchover valve mounted between the air spring and reservoir, is used to control the pressure of the system.

None of the prior art air suspension systems using auxiliary reservoirs of which I am aware, forms the reservoir from another air spring member, wherein the auxiliary air chamber is formed by the flexible bellows or sleeve of the air spring which extends between a pair of end members, one of which is a piston, and in which the piston is moved by an actuator to control the volume of air within the auxiliary air chamber, the latter being in direct fluid communication with the air chamber of the vehicle air spring.

The use of a second air spring member containing a flexible bellows, in contrast to the rigid canister of prior art air suspension systems, provides for a savings in weight, increases the life of the suspension system by eliminating the use of seals required in the rigid air reservoirs containing sliding pistons, and enables a readily available component to be used thereby reducing the cost of the system components.

SUMMARY OF THE INVENTION

Objectives of the invention include providing an improved variable rate air suspension system in which the auxiliary reservoir is formed by a known air spring containing a pair of end members and intervening flexible sleeve or bellows, wherein one of the end members preferably is a piston and is moved with respect to the other end member to vary the volume of the air chamber formed within the bellows, to provide for a variable spring rate for a vehicle air spring which is in fluid communication therewith.

A further objective of the invention is to provide such an air spring suspension system in which there is direct fluid communication between the vehicle air spring and auxiliary air reservoir, whereby both air supply chambers are at the same pressure; and in which the flexible sleeve of the auxiliary air reservoir can be collapsed or expanded by movement of one of its end members to adjust the overall volume of the air suspension system thereby affecting the spring rate of the vehicle air spring.

Another objective of the invention is to provide such an air spring suspension system which eliminates the use of sliding pistons and seals heretofore used in prior auxiliary air reservoirs having a rigid canister or container, and which reduces the weight of the auxiliary reservoir by use of a flexible sleeve instead of such rigid canisters.

A still further objective of the invention is to provide such an air spring suspension system in which the piston member of the auxiliary air reservoir is moved with respect to the opposite end member by a mechanical, electrical, hydraulic or pneumatic actuator means or motor to vary the volume of air in the vehicle air spring which is in direct fluid communication with the auxiliary air reservoir, to affect the spring rate thereof.

Still another objective of the invention is to provide such an improved air spring suspension system which lowers the cost and weight of prior art air suspension systems that use auxiliary reservoirs formed of rigid containers and internal pistons, by utilizing a readily available air spring as the auxiliary reservoir, thereby eliminating the manufacture and assembly of a completely separate component for the auxiliary reservoir.

These objectives and advantages are achieved by the improved variable rate air spring suspension system of the invention, the general nature of which may be stated as a suspension system for a vehicle having an air spring mounted between spaced components of the vehicle to absorb road shock imparted onto a wheel of the vehicle, which includes an auxiliary air reservoir for containing a supply of air which is fluidly connected to the vehicle air spring for transmitting air into and from the vehicle air spring, wherein said auxiliary reservoir is formed by a pair of spaced end members and an intervening flexible sleeve extending therebetween and forming an air supply chamber; and actuation means for changing the volume of the air supply chamber by changing the spacing between the end members.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
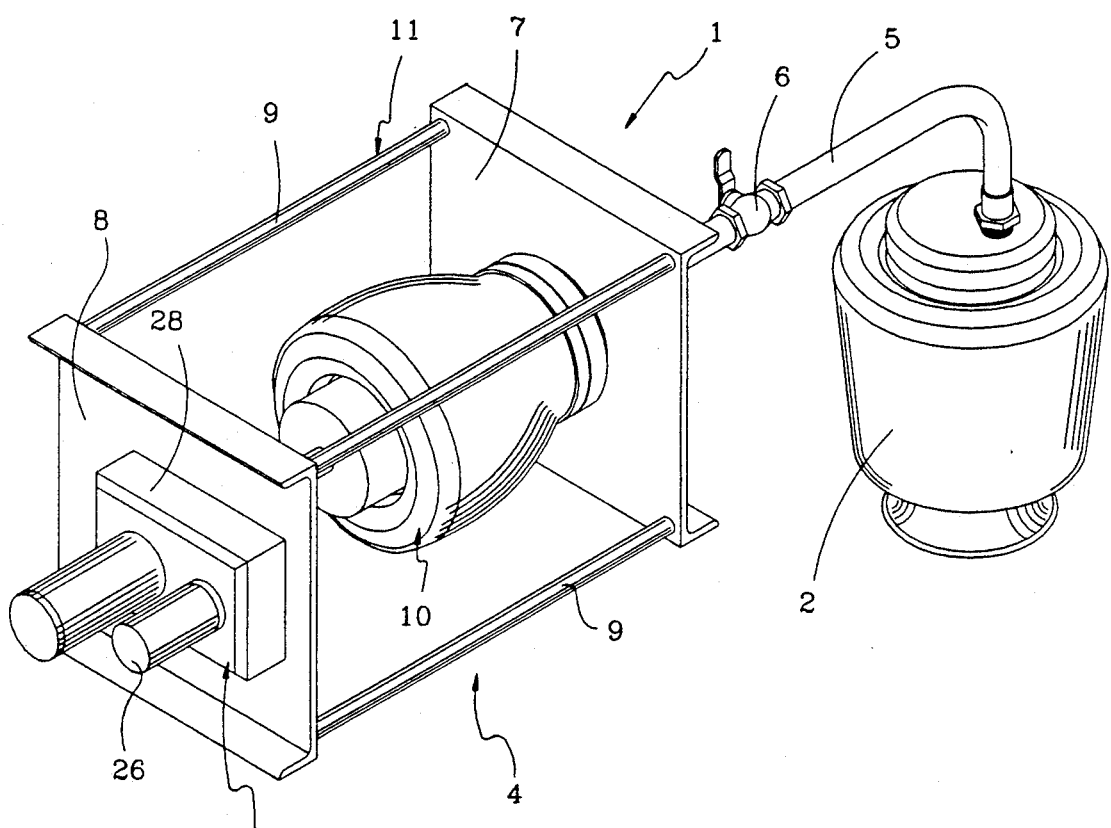
FIG. 1 is a diagrammatic perspective view of the improved variable rate air spring suspension system showing the auxiliary air reservoir connected to a known air spring of the type mounted between spaced components of a vehicle.

The improved air spring suspension system of the present invention is indicated generally at 1, and is shown particularly in FIG. 1. The improved system includes a known vehicle air spring 2 of the type adapted to be mounted between spaced structural components of a vehicle to absorb road shock imparted on the vehicle tires upon the tires encountering a depression or projection in the roadway. Air spring 2 is of a type well known in the art such as shown in U.S. Pat. Nos. 4,564,177, 4,718,650, 4,787,606 and 4,787,608.

In accordance with the main feature of the invention, an auxiliary air reservoir indicated generally at 4, is mounted at some location in the vehicle and is fluidly connected to air spring 2 by a hose 5 or other type of fluid transmission line. A manually operated shut off valve 6 may be mounted in hose 5 if desired.

Reservoir 4 includes a frame 11 formed by a pair of rigid end plates 7 and 8 and a plurality of connecting bars 9. Plates 7 and 8 may be U-shaped channels as shown in the drawings or may assume other configurations without affecting the concept of the invention.

Figure 2:
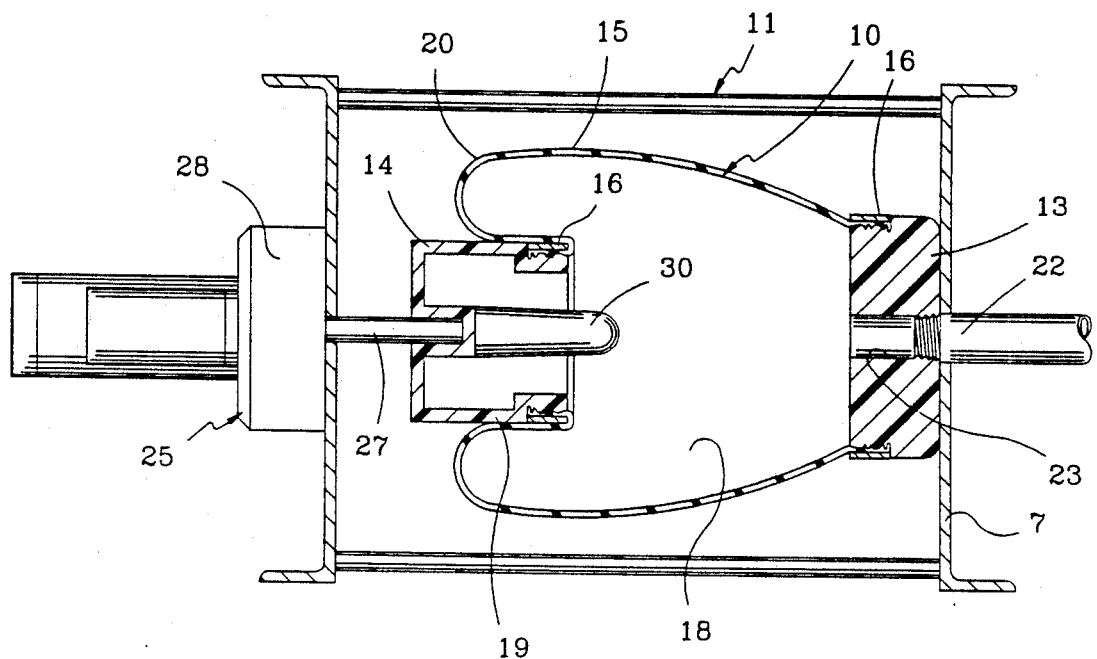
FIG. 2 is an enlarged longitudinal sectional view of the auxiliary air spring in a partially collapsed position.
Figure 3:
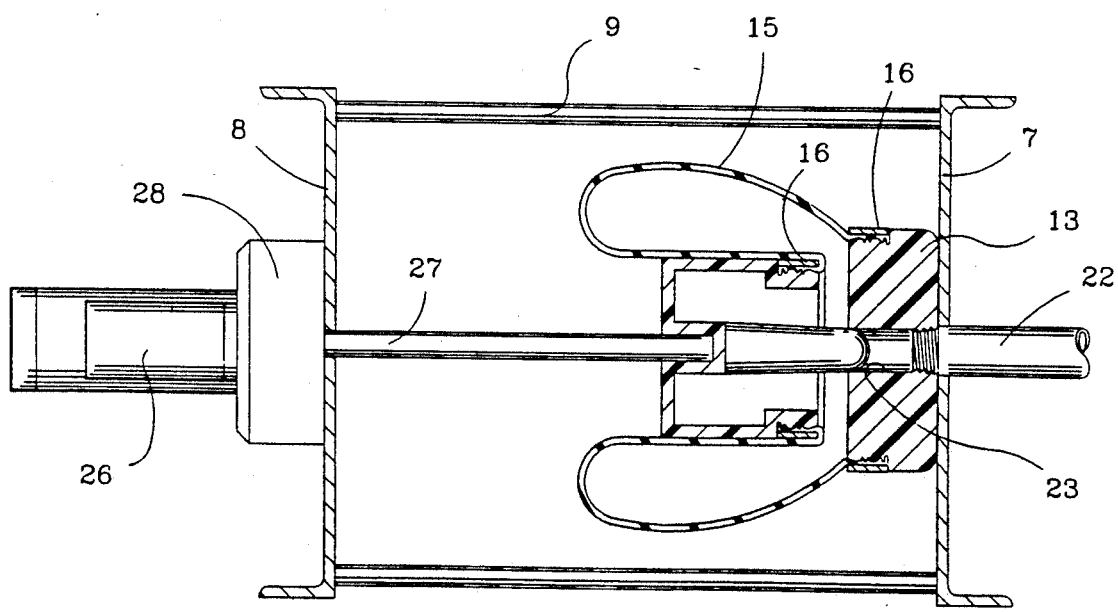
FIG. 3 is a sectional view similar to FIG. 2 showing the air spring of the auxiliary reservoir in fully collapsed and closed position.

Referring particularly to FIGS. 2 and 3, a second air spring indicated generally at 10, is mounted on end plate 7 and is located within frame 11 which provides a protective structure and mounting arrangement therefor. Air spring 10 may have various configurations and can be of a readily available type, such as vehicle air spring 2 or an air spring such as shown in the above referenced patents, which air springs are presently used in the air suspension art. As shown in FIGS. 2 and 3, air spring 10 includes spaced end members 13 and 14 and an intervening flexible sleeve or bellows 15. The open ends of sleeve 15 are sealingly connected in a fluid tight relationship to end members 13 and 14 by usual clamp rings 16. The interior of sleeve 15 forms a fluid chamber 18 which will contain a volume of fluid, such as air.

In most suspension systems, the particular fluid which is used will be air, and the term air is used throughout the present description in describing the particular fluid medium, although it is understood that other types of fluid can be utilized without departing from the concept of the invention. Preferably, end member 14 will be a piston having a cylindrical sidewall 19 around which a rolling lobe 20 of sleeve 15 will move, as the piston moves towards and away from end member 13 in varying the volume of chamber 18. End member 13 preferably is fixedly mounted on end plate 7 such as by a coupler member 22 of hose 5, which is threadably secured within a threaded central opening 23 of end member 13. Other types of attachment means can be used for securing member 13 on plate 7 if desired.

In further accordance with the invention, an actuator indicated generally at 25, is mounted on end plate 8. Actuator 25 will consist of a motor 26 which may be pneumatic, hydraulic, electric or mechanical, that is connected to a linearly movable shaft 27 through a gear box 28 or other force transmitting arrangement. Shaft 27 is connected to piston 14 and upon actuation of motor 26, will move piston 14 linearly or axially towards or away from opposite end member 13 to change the volume of air within chamber 18. A tapered elastomeric plug 30 having a conical end configuration, is mounted on piston 14, and is adapted to seal end member opening 23 (FIG. 3) when shaft 27 is in a fully extended position, to isolate auxiliary air spring 10 completely from vehicle air spring 2.

In operation, vehicle air spring 2 will be mounted between the desired spaced structural members of a vehicle and auxiliary air reservoir 4 is placed at a convenient location in the vehicle and fluidly connected to air spring 2 by supply hose 5. Actuation of motor 26 will advance or retract shaft 27 to change the volume of auxiliary fluid chamber 18, which, being in direct communication with the interior air chamber of air spring 2, will affect the overall volume of the air suspension system. Depending upon the selected volume of air, a particular spring rate will be provided to vehicle air spring 2. Thus, the auxiliary air spring enables each vehicle air spring to be tuned to a desired spring rate, either at the time of installation or it can be provided with an actuator which will provide for rapid movement of shaft 27 and adjustment of the volume of air to meet changing road conditions, or provide a nearly instantaneous change in volume to compensate for bumps or depressions experienced by the vehicle tire.

The use of second air spring 10 as the main component of the auxiliary air reservoir, enables a readily available component to be utilized, thereby reducing manufacturing costs and inventory, and provides a device which has been proven reliable in operation and which is able to withstand the harsh environments to which it may be exposed, and which eliminates the use of rigid canisters and internal sliding pistons, presently used for various prior art reservoirs. Again, any reduction in weight without sacrificing efficiency, is desirable in vehicles to improve gas mileage and vehicle efficiency.

Accordingly, the improved air spring suspension system is simplified, provides an effective, safe, inexpensive, and efficient system which achieves all the enumerated objectives, provides for eliminating difficulties encountered with prior art systems, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved air spring suspension system is constructed and used, the characteristics of the construction, and the advantageous, new and useful results obtained; the new and useful structures, devices, elements, arrangements, parts and combinations, are set forth in the appended claims.

I claim:

1. A variable rate air spring suspension system for a vehicle having an air spring mount between spaced components of the vehicle to absorb road shock imparted onto a wheel of said vehicle, said system including an auxiliary air reservoir for containing a supply of air connected to the vehicle air spring for conducting air into and from the air spring, said reservoir being formed by a pair of spaced end members and an intervening flexible sleeve extending therebetween and forming an air supply chamber, wherein one of said end members is a piston; and a motor mounted immediately adjacent the piston and connected thereto by a linearly movable shaft for moving said piston axially with respect to the other end member for changing the volume of the air supply chamber by changing the spacing between the end members.

2. The air spring suspension system defined in claim 1 in which the flexible sleeve (15) has a rolling lobe (20) which moves along the piston as the piston is moved with respect to the other end member (13).

3. The air spring suspension system defined in claim 1 in which an opening (23) is formed in the other end member (13) through which air is transferred between the vehicle air spring and air supply chamber; in which a plug (30) is mounted on the piston and located within the air supply chamber; and in which the plug can be moved into sealing engagement with the end member opening by the motor to isolate the vehicle air spring (2) from the auxiliary air reservoir (4).

4. The air spring suspension system defined in claim 3 in which the plug is a tapered elastomeric member.

5. The air spring suspension system defined in claim 1 in which the auxiliary air reservoir further includes a frame (11) for supporting the spaced end members and motor.

6. The air spring suspension system defined in claim 5 in which the frame has a pair of spaced end plates (7, 8); in which one of the end members (13) is mounted on one (7) of said end plates; and in which the motor is mounted on the other (8) of said end plates.

7. The air spring suspension system defined in claim 1 in which the motor is a pneumatic motor.

8. The air spring suspension system defined in claim 1 in which the motor is a hydraulic motor.

9. The air spring suspension system defined in claim 1 in which the motor is a mechanical motor.

10. The air spring suspension system defined in claim 1 in which the motor is an electrical motor.

* * * * *